United States Patent [19]
Azechi

[11] Patent Number: 5,942,583
[45] Date of Patent: Aug. 24, 1999

[54] PRIMER COMPOSITION

[75] Inventor: Syuuichi Azechi, Usui-gun, Japan

[73] Assignee: Shin-Etsu Chemical Co., Ltd., Japan

[21] Appl. No.: 08/955,625

[22] Filed: Oct. 22, 1997

[30] Foreign Application Priority Data

Oct. 23, 1996 [JP] Japan ..................... 8-299531

[51] Int. Cl.⁶ .................................. C08G 65/32
[52] U.S. Cl. .............. 525/403; 106/287.13; 106/287.16; 106/287.14; 525/476
[58] Field of Search .............. 106/287.13, 287.16, 106/287.14; 525/476, 403

[56] References Cited

U.S. PATENT DOCUMENTS

| | | | |
|---|---|---|---|
| 4,287,326 | 9/1981 | Mikami | 525/476 |
| 4,332,844 | 6/1982 | Hamada et al. | 427/387 |
| 5,326,844 | 7/1994 | Fujiki et al. | 528/15 |
| 5,755,866 | 5/1998 | Bayly et al. | 106/287.13 |

FOREIGN PATENT DOCUMENTS 52-32030  3/1977  Japan .

OTHER PUBLICATIONS

Derwent Abstract (English) of Japan 52–32030 (1977).

*Primary Examiner*—Melvyn I. Marquis
*Assistant Examiner*—Mark W. Milstead
*Attorney, Agent, or Firm*—Millen, White, Zelano, & Branigan, P.C.

[57] ABSTRACT

A primer composition contains (A) an organic silicon compound having a group of the formula: $-CR^2R^3(CH_2)_mCOOR^1$, (B) an organic silane compound of the average compositional formula: $R^7_bR^8_c(OR^9)_dSiO_{(4-b-c-d)/2}$, (C) an organic silicon compound containing a SiH group, represented by the average compositional formula: $R^{10}_eH_fSiO_{(4-e-f)/2}$ and/or an organic silicon compound containing a SiH group and 1–4 divalent or trivalent aromatic rings or a $C_2$–$C_{30}$ alkylene group, and (D) an epoxy resin. The primer composition assists in the adhesion of silicone elastomers to metallic and plastic substrates and is useful as adhesive.

7 Claims, No Drawings

PRIMER COMPOSITION

BACKGROUND OF THE INVENTION

1. Field of the Invention

This invention relates to a primer composition which assists in the adhesion of silicone elastomers to metallic and plastic substrates and accomplishes durable adhesion.

2. Prior Art

Various substrates of plastics such as epoxy resins, polycarbonate, PPS resin, PBT resin, ABS resins, and acrylic resins and metal materials are used in electric and electronic applications while silicone elastomers are bonded to such substrates through primer coatings. There is a desire to have a primer which accomplishes durable adhesion under any environmental conditions.

There are known a number of primer compositions for the substrates to which silicone elastomers are to be bonded. For example, JP-A 32030/1977 discloses a composition comprising a tetraorganotitanate, an epoxy group-bearing alkoxysilane, an aliphatic unsaturated bond-bearing organic silicon compound, a platinum compound, a polymer soluble in organic solvent, and an organic solvent. JP-B 2107/1986 corresponding to U.S. Pat. No. 4,332,844 discloses a composition comprising an alkoxy group-bearing organic silicon compound, an organic titanium compound, and a hydrosilyl group-bearing organic silicon compound. JP-A 25615/1994 corresponding to U.S. Pat. No. 5,326,844 discloses a composition comprising in admixture, an alkoxy-α-silyl ester and an alkoxysilane and/or an organometallic compound containing titanium or tin.

These primer compositions do not always achieve satisfactory adhesion. Some primer compositions provide satisfactory initial adhesion, but their long-term bond durability under rigorous conditions is insufficient. It is thus desired to develop a primer which forms a durable bond.

SUMMARY OF THE INVENTION

Therefore, an object of the invention is to provide a primer composition having improved bond strength and bond durability.

We have found that by blending (A) an organic silicon compound having a group of the general formula (1) in a molecule, (B) an organooxy group-bearing organic silane compound of the average compositional formula (2) and/or a partially hydrolyzed condensate thereof, (C) an organic silicon compound containing a hydrosilyl (SiH) group in a molecule, represented by the average compositional formula (3) and/or an organic silicon compound containing a SiH group and 1 to 4 divalent or trivalent aromatic rings or an alkylene group of 2 to 30 carbon atoms in a molecule, and (D) a epoxy resin soluble in an organic solvent, and preferably further blending an organometallic compound containing titanium or tin, platinum or a platinum compound, an amine, and/or an acid anhydride, there is obtained a primer composition which assists in bonding silicone elastomers to various resinous and metallic substrates and forms an adhesive layer having bond durability.

According to the invention, there is provided a primer composition comprising (A) an organic silicon compound having in a molecule at least one group of the following general formula (1):

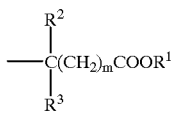
(1)

wherein $R^1$ is a substituted or unsubstituted monovalent hydrocarbon group or a group $-QSi(OR^4)_a(R^5)_{3-a}$ wherein Q is a divalent organic group, $R^4$ and $R^5$ each are a substituted or unsubstituted monovalent hydrocarbon group, letter a is an integer of 0 to 3, $R^2$ and $R^3$ each are a hydrogen atom or substituted or unsubstituted monovalent hydrocarbon group, and letter m is equal to 0, 1 or 2, (B) an organic silane compound of the following average compositional formula (2):

(2)

wherein $R^7$ is a substituted or unsubstituted monovalent hydrocarbon group, $R^8$ is a monovalent organic group having an addition reactive or condensation reactive functional group, $R^9$ is a substituted or unsubstituted monovalent hydrocarbon group, letters b, c, and d are numbers satisfying $0 \leq b \leq 3$, $0 \leq c \leq 3$, $0 < d \leq 4$, and $0 < b+c+d \leq 4$, and/or a partially hydrolyzed condensate thereof, (C) (C-a) an organic silicon compound having at least one SiH group in a molecule, represented by the following average compositional formula (3):

(3)

wherein $R^{10}$ is a substituted or unsubstituted monovalent hydrocarbon group, letters e and f are numbers satisfying $0 < e \leq 3$, $0 < f \leq 3$, and $1 \leq e+f < 4$, and/or (C-b) an organic silicon compound having at least one SiH group and containing one to four substituted or unsubstituted divalent or trivalent aromatic rings or an alkylene group of 2 to 30 carbon atoms in a molecule, and (D) an epoxy resin soluble in an organic solvent.

Preferably, the primer composition further contains at least one member of (E) an organic compound containing titanium or tin, (F) platinum or a platinum compound, (G) an aliphatic, alicyclic or aromatic amine, and (H) an acid anhydride.

DETAILED DESCRIPTION OF THE INVENTION

A first essential component or component (A) used in the primer composition of the invention is an organic silicon compound having at least one group of the general formula (1), preferably formula (1a) in a molecule, for example, in the form of a silane, siloxane, silalkylene, silarylene, and silalkylenesiloxane. Component (A) is effective for improving bond durability.

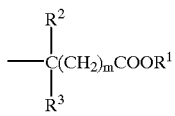
(1)

-continued

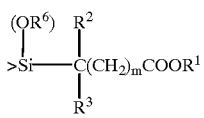  (1a)

In the formulae, $R^1$ is a substituted or unsubstituted monovalent hydrocarbon group or a group represented by the formula:

wherein Q is a divalent organic group, $R^4$ and $R^5$ each are a substituted or unsubstituted monovalent hydrocarbon group, letter a is an integer of 0 to 3. $R^2$ and $R^3$ each are a hydrogen atom or a substituted or unsubstituted monovalent hydrocarbon group. Letter m is equal to 0, 1 or 2. $R^6$ is a substituted or unsubstituted monovalent hydrocarbon group.

The monovalent hydrocarbon groups represented by $R^1$, $R^4$, and $R^5$ are preferably those having 1 to 16 carbon atoms, more preferably 1 to 8 carbon atoms, for example, alkyl groups such as methyl, ethyl, propyl, butyl, and octyl; cycloalkyl groups such as cyclohexyl; alkenyl groups such as vinyl; and aryl groups such as phenyl. Also included are substituted ones of these groups wherein some or all of the hydrogen atoms are replaced by halogen atoms or cyano groups. It is noted that $R^4$ may also be an alkoxy-substituted group. The divalent organic groups represented by Q are preferably divalent hydrocarbon groups such as alkylene groups of 1 to 8 carbon atoms and arylene groups, which may have an oxygen or sulfur atom.

Each of $R^2$ and $R^3$ is a hydrogen atom or a substituted or unsubstituted monovalent hydrocarbon group. Examples of the monovalent hydrocarbon group are as described for $R^1$, with lower alkyl groups being especially preferred. $R^6$ is a substituted or unsubstituted monovalent hydrocarbon group which is as described for $R^4$. Letter m is equal to 0, 1 or 2.

Illustrative, non-limiting examples of the organic silicon compound having at least one group of formula (1) or structure of formula (1a) in a molecule are given below. It is understood that Me is methyl, Et is ethyl, Bu is butyl, and Pr is propyl throughout the specification.

7

$(MeO)_3SiCH_2COOMe$,  $(MeO)_3SiCH_2COOEt$, $(MeO)_3SiCH_2COOPr$,  $(MeO)_3SiCH_2COOn\text{-}C_8H_{17}$,

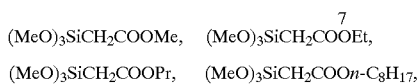

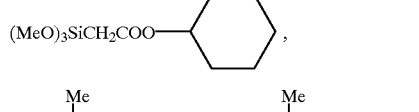

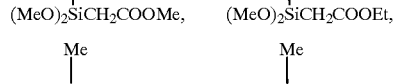

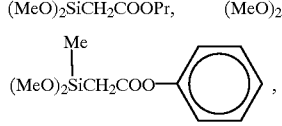

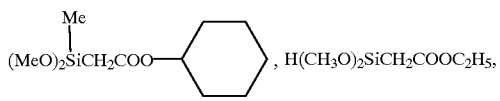

$(CH_2{=}CH)(CH_3O)_2SiCH_2COOC_2H_5$,

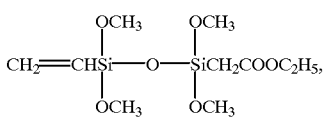

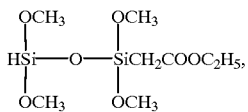

$(CH_3O)_3SiCHCOOCH_2CH{=}CH_2$,  (with $CH_3$ substituent)

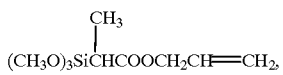

$(CH_3O)_3SiCHCOOC_3H_8Si(OCH_3)_3$,  $(EtO)_3SiCH_2COOMe$,  (with $CH_3$ substituent)

$(EtO)_3SiCH_2COOEt$,  $(EtO)_3SiCH_2COOPr$,  $(EtO)_3SiCH_2COOBu$,

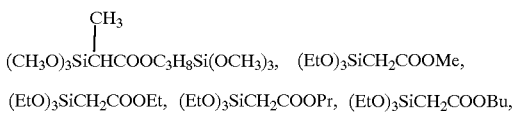  ,  $(MeO)_3SiCH_2COOn\text{-}C_8H_{17}$,

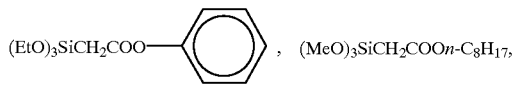

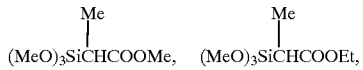

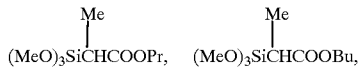

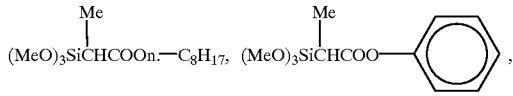

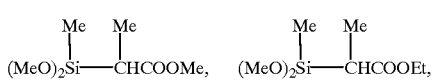

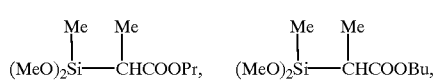

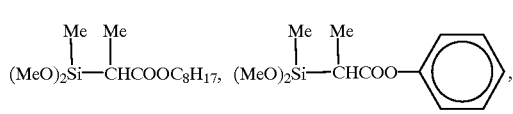

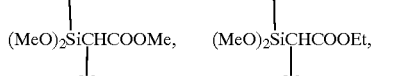

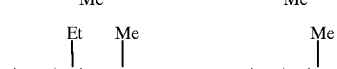

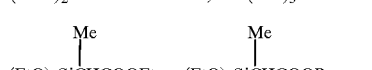

-continued (EtO)₃SiCH(Me)COOPh, (EtO)₂Si(Me)CH(Me)COOMe, (EtO)₂Si(Me)CH(Me)COOEt, (EtO)₂Si(Me)CH(Me)COOPr, (EtO)₂Si(Ph)CHCOOMe, (EtO)₂Si(Et)CH(Me)COOEt,
                    (Me)

(MeO)₃SiCH(Et)COOMe, (MeO)₃SiCH(Et)COOEt, (MeO)₃Si(Et)CH(Me)COOMe, (BuO)₃SiCH₂COOMe, (BuO)₃SiCH(Me)COOEt, (C₈H₁₇O)₃SiCH₂COOMe, (C₈H₁₇O)₃SiCH(Me)COOEt, (MeO)₃SiCH₂CH₂COOMe, (MeO)₃SiCH₂CH₂COOEt, (MeO)₃SiCH(Me)CH₂COOMe, (MeO)₃SiCH(Me)CH₂COOEt, (MeO)₃SiCH₂CH₂CH₂COOMe, (MeO)₃SiCH₂CH₂CH₂COOEt, (EtO)₃SiCH₂CH₂CH₂COOMe, (EtO)₃SiCH₂CH₂CH₂COOEt, Me₃SiCH₂COOMe, MeSiCH₂COOEt,

Me₃SiCH₂COOn-C₃H₇, Me₃SiCH₂COOOn-Bu,

Me₃SiCH₂COOn-C₈H₁₇, Me₃SiCH₂COOPh,

Et₃SiCH₂COOEt, Et(Me)₂SiCH₂COOEt, Et₂SiCH₂COOMe, (n-C₃H₇)₃SiCH₂COOEt, (n-C₃H₇)₃SiCH₂COOMe, (n-C₃H₇)₃SiCH₂COOn-Bu, (n-C₃H₇)₃SiCH₂COOn-C₈H₁₇, n-C₆H₁₃Si(Me)₂CH₂COOMe, n-C₆H₁₃Si(Me)₂CH₂COOEt, n-C₆H₁₃Si(Me)₂CH₂COOn-Bu, n-C₆H₁₃Si(Me)₂CH₂COOn-C₆H₁₃, n-C₈H₁₇Si(Me)₂CH₂COOEt, n-C₈H₁₇Si(Me)₂CH₂COOMe, n-C₈H₁₇Si(Me)₂CH₂COOn-Bu,

PhSi(Me)₂CH₂COOMe, n-C₈H₁₇Si(Me)₂CH₂COOPh,

PhSi(Me)₂CH₂COOEt,

PhSi(Me)₂CH₂COOn-Bu,

PhSi(Me)₂CH₂COOC₆H₁₃,

PhSi(Me)₂CH₂COOn-C₈H₁₇, (Ph)₂Si(Me)CH₂COOMe, (Ph)₂Si(Me)CH₂COOEt, (Ph)₂Si(Me)CH₂COOn-Bu, (Ph)₂Si(Me)CH₂COOn-C₆H₁₃, (Ph)₂Si(Me)CH₂COOn-C₈H₁₇,

Me₃SiCH₂COO-C₆H₄-Me, Me₃SiCH₂CH₂COOEt,

Et₃SiCH₂CH₂COOMe, Me₃SiCH(Me)COOEt, Me₃SiCH(Me)COOMe,

-continued

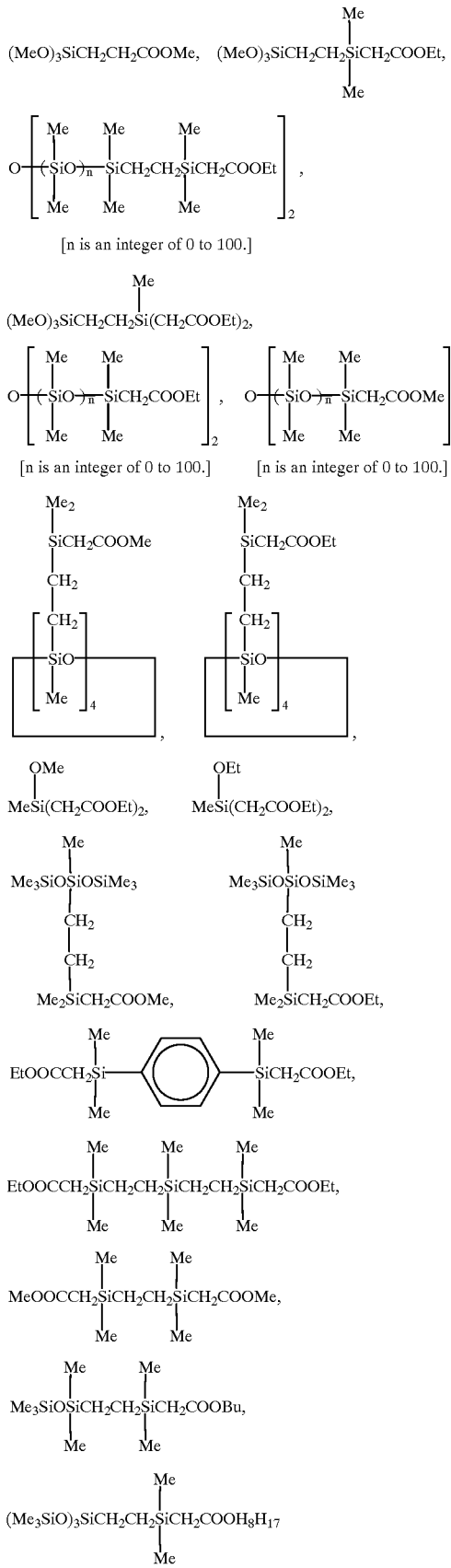

The foregoing organic silicon compounds can be synthesized by well-known methods, for example, by reacting a α-haloester with trimethoxychlorosilane in the presence of a zinc compound according to Reformatsky reaction followed by dehydrochlorination. Also they may be readily obtained by reacting an acrylate with hydrotrimethoxysilane in the presence of a platinum catalyst through alpha-addition of hydrosilylation.

A second essential component or component (B) is an organic silane compound of the average compositional formula (2) having in a molecule at least two, preferably at least three organooxy groups (e.g., alkoxy groups) each attached to a silicon atom and/or a partially hydrolyzed condensate thereof. This organic silane compound may take the form of a siloxane, for example, and is effective for imparting adhesiveness and bond durability.

$$R^7_b R^8_c (OR^9)_d SiO_{(4-b-c-d)/2} \qquad (2)$$

In formula (2), $R^7$ is a substituted or unsubstituted monovalent hydrocarbon group, $R^8$ is a monovalent organic group having a functional group capable of addition reaction or condensation reaction, $R^9$ is a substituted or unsubstituted monovalent hydrocarbon group, letters b, c, and d are numbers satisfying $0 \leq b \leq 3$, $0 \leq c \leq 3$, $0 < d \leq 4$, and $0 < b+c+d \leq 4$.

The monovalent hydrocarbon groups represented by $R^7$ are preferably those having 1 to 8 carbon atoms and free of an aliphatic unsaturated bond, for example, alkyl groups such as methyl, ethyl, propyl, isopropyl, butyl, isobutyl, tert-butyl, hexyl, cyclohexyl, and octyl; aryl groups such as phenyl, tolyl, and xylyl; aralkyl groups such as benzyl and phenylethyl; and substituted ones of these hydrocarbon groups wherein some or all of the hydrogen atoms are replaced by halogen atoms or cyano groups, that is, halogen or cyano-substituted hydrocarbon groups such as chloromethyl, bromoethyl, 3,3,3-trifluoropropyl, 3-chloropropyl and cyanoethyl.

The organic group having a functional group represented by $R^8$ is a monovalent group having a functional group capable of addition reaction or condensation reaction. Included are groups represented by $CH_2=CR-COO(CH_2)_n-$ wherein R is hydrogen or methyl and n is an integer of 1 to 8, such as (meth)-acryloxypropyl; alkenyl groups of 2 to 6 carbon atoms such as vinyl, allyl, propenyl, isopropenyl, and butenyl; groups represented by $H_2N-(CH_2)_n-$ wherein n is an integer of 1 to 8, such as aminopropyl; groups represented by $HS(CH_2)_n-$ wherein n is an integer of 1 to 8, such as mercaptopropyl; and groups represented by $G-(CH_2)_n-$ wherein G is an epoxy-containing group as defined below and n is an integer of 1 to 8, such as glycidyloxypropyl.

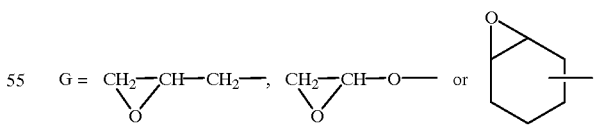

The monovalent hydrocarbon groups represented by $R^9$ are preferably those having 1 to 8 carbon atoms, with examples being as described for $R^1$. Alkyl groups and alkoxy-substituted alkyl groups are preferred. Examples include methyl, ethyl, propyl, butyl, pentyl, octyl, methoxyethyl, methoxymethyl, ethoxyethyl, and ethoxymethyl.

Letters b, c, and d are numbers satisfying $0 \leq b \leq 3$, preferably $0 \leq b \leq 2$, $0 \leq c \leq 3$, preferably $0 < c \leq 2$, $0 < d \leq 4$, preferably 1≦d<4, more preferably 2≦d≦3, and 0<b+c+d≦4, preferably 1≦b+c+d≦3.

Component (B) is classified into tetra(organooxy)-silanes such as tetraalkoxysilanes, organo-tri(organooxy)silanes such as organotrialkoxysilanes, diorganodi(organooxy) silanes such as diorganodialkoxy-silanes, and as partially hydrolyzed condensates of these silane compounds organooxy group-bearing siloxanes including organoalkoxysiloxanes having two or more silicon atoms and alkoxysiloxanes having two or more silicon atoms. The organooxy group-bearing siloxanes including organoalkoxysiloxanes and alkoxysiloxanes may have a linear, cyclic, branched or network structure and be either homopolymers or copolymers. Such siloxanes which are liquid at room temperature are often preferred.

Examples of the organic silicon compound of formula (2) include vinyltrimethoxysilane, vinyltriethoxysilane, vinyltris(β-methoxyethoxy)silane, γ-methacryloxypropyltrimethoxysilane, γ-methacryloxypropyltriethoxysilane, γ-acryloxypropyltrimethoxysilane, allyltrimethoxysilane, allyltriethoxysilane, γ-mercaptopropyltrimethoxysilane, N-β-(aminoethyl)-γ-aminopropyltrimethoxysilane, γ-aminopropyltriethoxysilane, mercaptoethyltriethoxysilane, γ-glycidoxypropyltrimethoxysilane, β-(3,4-epoxycyclohexyl)ethyltrimethoxysilane, tetramethoxysilane, tetraethoxysilane, tetrapropoxysilane, tetrabutoxysilane, and partially hydrolyzed condensates thereof, that is, siloxane compounds containing at least two, preferably at least three organooxy groups represented by $OR^9$ in a molecule.

The amount of component (B) blended may be adjusted in accordance with the amount of component (A) blended. Usually, about 1 to 500 parts, preferably about 10 to 400 parts by weight of component (B) is blended per 100 parts by weight of component (A).

A third essential component or component (C) is selected from components (C-a) and (C-b) and mixtures thereof.

(C-a) an organic silicon compound having at least one SiH group, preferably at least two SiH groups, more preferably at least three SiH groups in a molecule and represented by the following average compositional formula (3):

$$R^{10}{}_e H_f SiO_{(4-e-f)/2} \quad (3)$$

wherein $R^{10}$ is a substituted or unsubstituted monovalent hydrocarbon group, letters e and f are numbers satisfying 0≦e≦3, 0<f≦3, and 1≦e+f<4, typically in the form of an organohydrogenepolysiloxane.

(C-b) an organic silicon compound having at least one SiH group, preferably at least two SiH groups, more preferably at least three SiH groups and containing one to four substituted or unsubstituted divalent or trivalent aromatic rings or an alkylene group of 2 to 30 carbon atoms in a molecule, typically in the form of an organohydrogenepolysiloxane.

Component (C-a) is first described. In formula (3), the monovalent hydrocarbon group represented by $R^{10}$ is a monovalent group attached to a silicon atom forming a siloxane skeleton in a molecule, preferably having 1 to 20 carbon atoms, more preferably 1 to 10 carbon atoms, for example, alkyl groups such as methyl, ethyl, propyl, butyl, hexyl, octyl, decyl, undecyl, dodecyl, and octadecyl; cycloalkyl groups such as cyclohexyl and cyclooctyl; aryl groups such as phenyl, naphthyl, anthranyl, methylphenyl, and xylyl; aralkyl groups such as benzyl, phenylethyl, and cumyl; alkenyl groups such as vinyl, allyl, and cyclohexenyl; and substituted ones of these hydrocarbon groups wherein some or all of the hydrogen atoms are replaced by halogen atoms or cyano groups, that is, halogen or cyano-substituted hydrocarbon groups such as chloromethyl, p-chlorophenyl, m-chlorophenyl, o-chlorophenyl, p-trifluoromethylphenyl, o-trifluoromethylphenyl, 3,3,3-trifluoropropyl, and cyanoethyl. Also included are hydrocarbon groups having substituted thereon a silyl group such as trialkylsilyl, alkyldialkoxysilyl, trialkoxysilyl, alkyldialkenyloxysilyl and trialkenyloxysilyl, for example, γ-trimethylsilylpropyl, γ-dimethoxymethylsilylpropyl, γ-dimethylmethoxysilylpropyl, γ-tris(isopropenoxy)silylpropyl, γ-trimethoxysilylpropyl, and γ-triethoxysilylpropyl groups; hydrocarbon groups having substituted thereon an epoxy group, for example, γ-glycidoxypropyl and β-(3,4-epoxycyclohexyl)ethyl; and hydrocarbon groups having an ester (—COO—), urethane (—NHCOO—), carbonyl (—CO—) or (meth)acryloxy structure.

The epoxy group-substituted hydrocarbon groups mentioned above include an epoxy group attached to a silicon atom through a divalent hydrocarbon group such as an alkylene group represented by the formula $G-(CH_2)_n-$. The alkoxy groups in the dialkoxysilyl and trialkoxysilyl groups are preferably those having 1 to 4 carbon atoms, for example, methoxy, ethoxy, propoxy, isopropoxy, butoxy, isobutoxy, tert-butoxy, methoxymethoxy, methoxyethoxy, ethoxymethoxy, and ethoxyethoxy. The alkenyloxy groups in the dialkenyloxysilyl and trialkenyloxysilyl groups are preferably those having 1 to 4 carbon atoms, for example, vinyloxy, allyloxy, propenyloxy, isopropenyloxy, and butenyloxy.

The hydrogen atom attached to a silicon atom (that is, SiH group) may be one attached to a silicon atom at the end of a molecular chain, that is, a silicon atom of a monofunctional siloxane unit represented by $\equiv SiO_{1/2}$ although it is desirably one attached to a silicon atom intermediate a molecular chain, that is, a silicon atom of a difunctional siloxane unit represented by $=SiO_{2/2}$.

In formula (3), letters e and f are numbers satisfying 0<e≦3, preferably 1≦e≦2, 0<f≦3, preferably 0.1≦f≦1, and 1≦e+f<4, preferably 1.6≦e+f≦3. The organic silicon compounds or organopolysiloxanes of formula (3) may be linear, branched or cyclic.

Usually the organic silicon compounds of formula (3) have a viscosity of about 1 to 1,000 centipoise at 25° C., preferably about 5 to 200 centipoise at 25° C.

Illustrative, non-limiting examples of the organic silicon compound of formula (3) are given below.

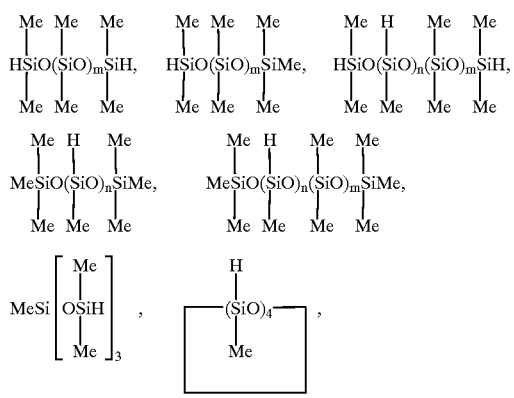

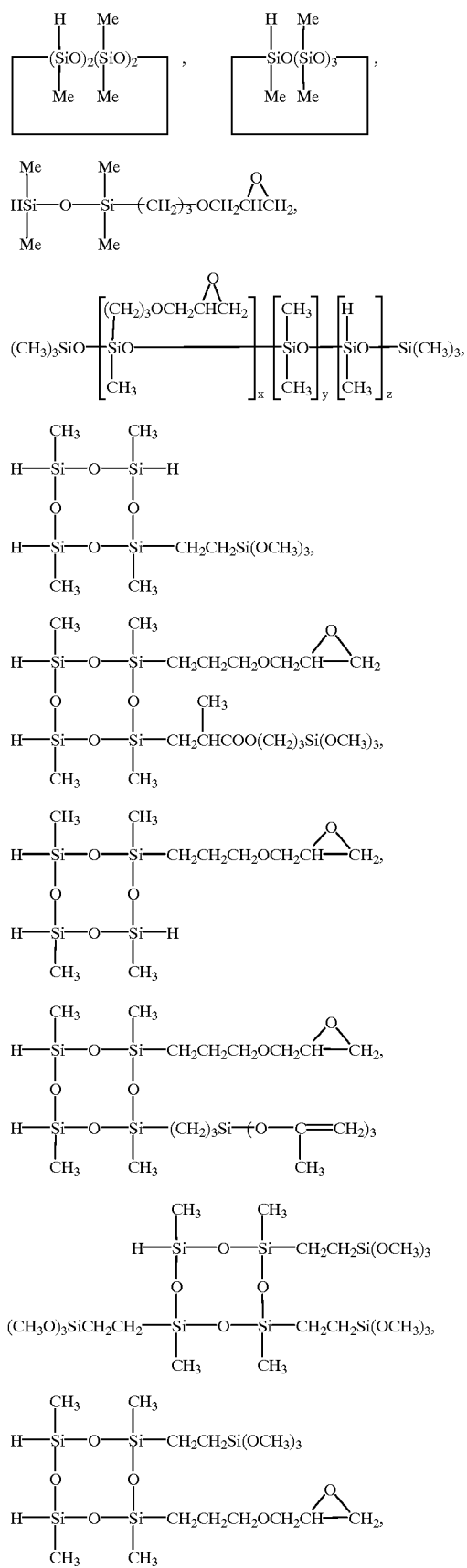
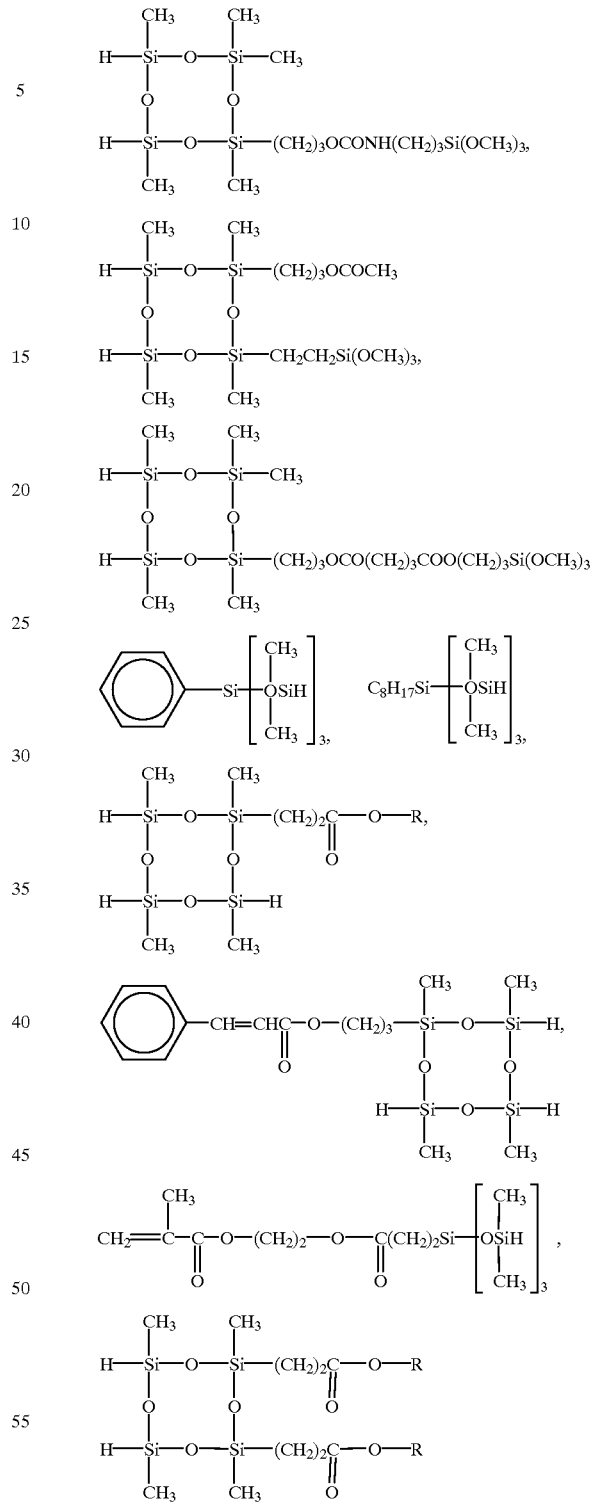

In the formulae, m is an integer of 0 to 100, n is an integer of 1 to 100, x is an integer of 1 to 50, y is an integer of 1 to 100, and z is an integer of 1 to 100.

Component (C-b) is an organic silicon compound having at least one SiH group in a molecule and containing a monovalent to trivalent group having one to four substituted or unsubstituted divalent or trivalent aromatic rings (e.g., of phenylene skeleton) or an alkylene group of 2 to 30 carbon atoms as a mono- to trivalent group attached to a silicon atom forming a siloxane skeleton in a molecule. It is typically in the form of an organohydrogenepolysiloxane.

The mono- to trivalent group having a divalent or trivalent aromatic ring and the alkylene group may be one having an ester structure (—COO—) or ether oxygen (—O—). Examples of the mono- to trivalent group having a divalent or trivalent aromatic ring and the alkylene group are those having the following partial structures.

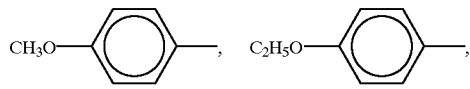

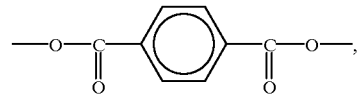

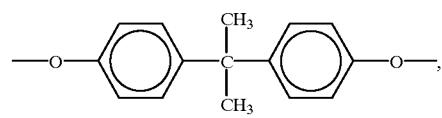

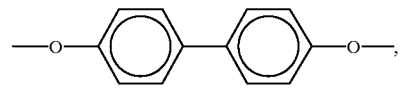

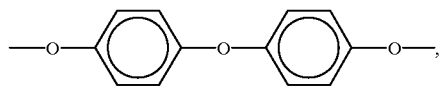

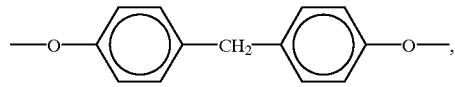

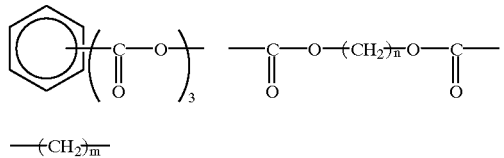

Note that n is an integer of 1 to 6 and m is an integer of 2 to 30.

Illustrative, non-limiting examples of the compound (C-b) are given below.

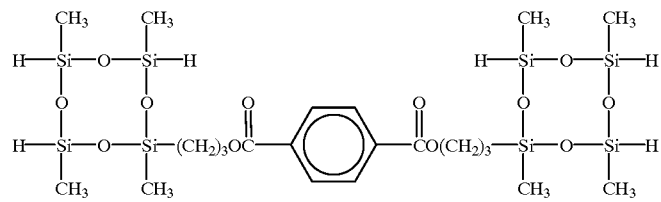

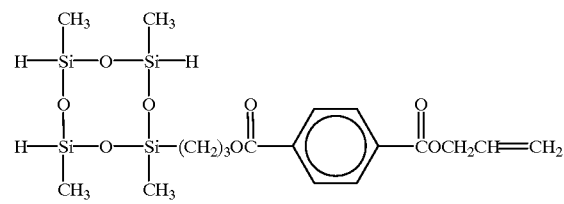

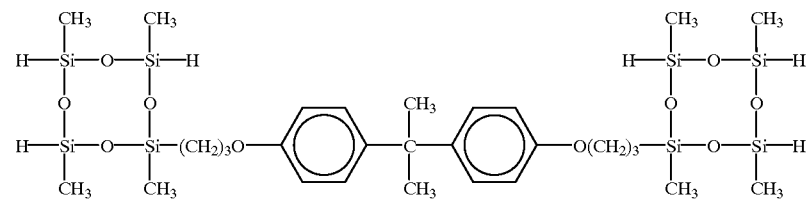

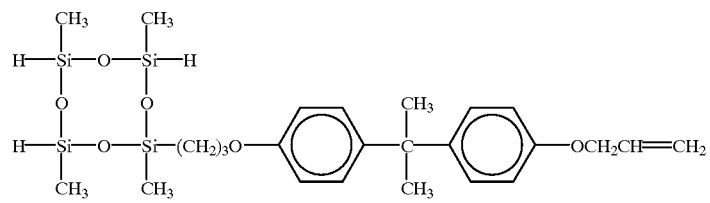

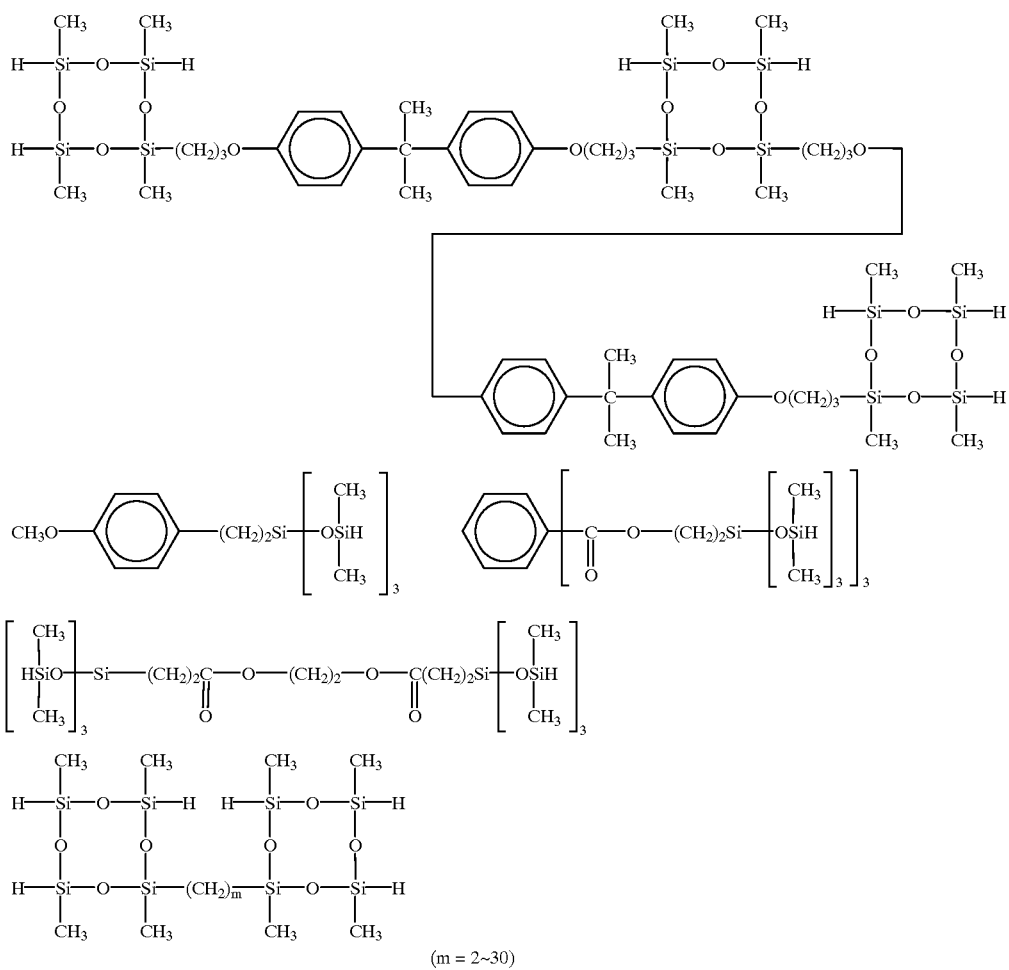

The organic silicon compounds used as components (C-a) and (C-b) are preferably those having a mono- to trivalent cyclic methylhydrogensiloxane structure, shown below, as a partial structure in a molecule.

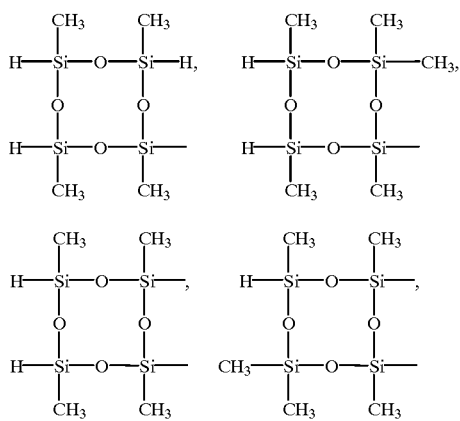

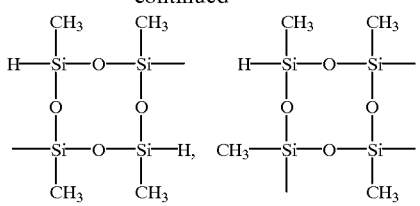

As component (C), one or more members of components (C-a) and (C-b) may be used.

The amount of component (C) blended is usually about 1 to 700 parts, preferably about 6 to 600 parts by weight per 100 parts by weight of component (A). Less than 1 part of component (C) would fail to provide adhesiveness whereas more than 700 parts of component (C) would rather detract from adhesiveness, that is, the adhesion of a primer composition to a substrate and is uneconomical.

A fourth essential component or component (D) is an epoxy resin soluble in an organic solvent for improving the bond durability of the resin system. Any of epoxy resins commonly used in epoxy resin compositions may be used insofar as they have at least two epoxy groups in a molecule. Exemplary epoxy resins are bisphenol A type epoxy resins, bisphenol F type epoxy resins, phenol novolak type epoxy resins, cresol novolak type epoxy resins, alicyclic epoxy resins, epoxy resins containing a heterocycle such as triglycidyl isocyanate and hydantoinepoxy, hydrogenated bisphenol A type epoxy resins, aliphatic epoxy resins such as propylene glycol diglycidyl ether and pentaerythrytol polyglycidyl ether, epoxy resins obtained by reacting aromatic, aliphatic or alicyclic carboxylic acids with epichlorohydrin, spiro ring-containing epoxy resins, glycidyl ether type epoxy resins which are reaction products of o-allylphenyl novolak compounds and epichlorohydrin, and glycidyl ether type epoxy resins which are reaction products of diallyl bisphenol compounds having an allyl group at the ortho position with respect to the hydroxyl group of bisphenol A and epichlorohydrin. Generally, they do not contain a silicon atom in their molecule. Preferred are bisphenol A type epoxy resins which are condensation reaction products of bisphenol A and epichlorohydrin.

The amount of component (D) blended is usually about 1 to 700 parts, preferably about 5 to 600 parts by weight per 100 parts by weight of component (A). Less than 1 part of component (D) would fail to provide adhesiveness whereas a primer composition containing more than 700 parts of component (D) would form a primer coating which is too thick and brittle.

In one preferred embodiment of the invention, an organic compound containing titanium or tin is contained in the primer composition as component (E). More specifically, an organic titanium compound and/or an organic tin compound is blended. These organometallic compounds are effective for curing the primer composition, accelerating the air drying thereof, and improving the adhesiveness, thereof.

Examples of the organic titanium compound include titanate esters such as tetraisopropyl titanate, tetra-n-butyl titanate, butyltitanate dimer, tetra(2-ethylhexyl) titanate, diethoxytitanium acetylacetonato, titanium diacetylacetonato, titanium octyl glycolate, titanium lactate, titanium lactate ethyl ester, titanium triethanolaminato, and partial hydrolysate condensates thereof, partially alkoxylated chelate compounds of titanium, titanium chelate compounds, titanium silicate ester and chelates thereof. The organic tin compounds are those commonly used in condensation type room temperature curable silicone compositions and examples include dibutyltin dilaurate, dibutyltin dibenzylmaleate, dibutyltin dioctoate, tin dioctylate, di-n-butyldimethoxytin, bisethylmaleyldibutyltin oxide, dibutyltin benzylmaleate, tetrabutylbis(ethylmaleate)ditin oxide, dibutyltin bis(isooctylphthalate), dibutyltin bis(3-methyl-3-methoxybutylmaleate), dioctyltin bis(benzylmaleate), and dioctyltin dilaurate. These organometallic compounds may be used alone or in admixture of two or more.

The amount of component (E) blended is usually about 5 to 700 parts, preferably about 10 to 600 parts by weight per 100 parts by weight of component (A). Less than 5 parts of component (E) would fail to achieve its addition purpose whereas more than 700 parts of component (E) would be uneconomical.

In one embodiment of the invention, the primer composition is used as an adhesive for addition curing type silicone elastomers. In this embodiment, platinum or a platinum compound is preferably blended in the primer composition in addition to the above-mentioned components because a further improvement in adhesiveness is expectable.

Examples of the platinum compound include platinum black, chloroplatinic acid, alcohol modified products of chloroplatinic acid, complexes of chloroplatinic acid with olefins, aldehydes, vinylsiloxanes, and acetylene alcohols.

The amount of platinum or platinum compound added is a catalytic amount although it is desirably 1 to 10,000 ppm, more desirably 2 to 1,000 ppm of platinum based on the total weight of components (A) to (D).

In another preferred embodiment of the invention, an aliphatic, alicyclic or aromatic amine is blended in the primer composition for improving the bond durability thereof. In this embodiment, amines serving as a curing co-catalyst for epoxy resins are preferred although other amines may be used.

Examples of the aliphatic amine include ethylene amines, N-aminoethylpiperadine, meta-xylylenediamine, 1,3-bis(aminomethyl)cyclohexane, and polyamides. Examples of the alicyclic amine include p-menthane diamine, isophorone diamine, bis(4-amino-3-methylcyclohexyl)methane, and 2-ethyl-4-methylimidazole. Examples of the aromatic amine include meta-phenylene diamine, 4,4-diaminodipheylmethane, 4,4-diaminodiphenylsulfone, and dicyandiamide.

The amount of the amine blended is a catalytic amount although it is desirably 0.001 to 10 parts by weight per 100 parts by weight of components (A) to (D) combined.

Acid anhydrides may be blended in the primer composition of the invention For the same reason as the amines, that is, for improving the bond durability. Exemplary acid anhydrides are phthalic anhydride, hexahydrophthalic anhydride, pyromellitic anhydride, nadic anhydride, and dodecenylsuccinic anhydride. The acid anhydride may be blended in a similar amount to the above-mentioned amine.

When it is desired to increase the thickness of a coating, a vinyl group-bearing organopolysiloxane is added to the primer composition. Furthermore, various inorganic fillers such as finely divided silica may be blended for the purpose of improving the strength of a coating.

Moreover, aluminum compound catalysts such as acetylacetonatoaluminum may be added as an epoxy resin curing agent.

The primer composition of the invention may further contain other optional components, for example, well-known additives including heat resistance modifiers and coloring agents such as red iron oxide, cerium oxide, cerium hydroxide, titanium oxide, and carbon black, in such an amount as not to impair the object of the invention.

Also blendable in the primer composition of the invention is an organic solvent. The type and amount of the organic solvent are adjusted in consideration of working conditions of the primer composition. Examples of the organic solvent in which the foregoing components are soluble include xylene, toluene, benzene, heptane, hexane, trichloroethylene, perchloroethylene, methylene chloride, cetyl acetate, methyl isobutyl ketone, methyl ethyl ketone, ethanol, isopropanol, butanol, Freon 113, ligroin, rubber gasoline, and silicone solvents. A solvent or a mixture of solvents may be used depending on the desired rate of evaporation upon coating of the primer composition.

The primer composition of the invention is readily obtained by uniformly mixing the foregoing components at room temperature or elevated temperature. If desired, a minor amount of water may be added upon mixing.

Where the primer composition of the invention is used for adhesion, it may be thinly applied to a cleaned surface of a substrate or adherend by any suitable means such as brush coating. The amount of the primer composition coated is a sufficient amount to form a thin primer film on the substrate surface because a larger amount of the primer composition would rather obstruct the adhesion between the substrate and a coating composition such as silicone elastomer. Preferably the coating of the primer composition is air dried for more than 30 minutes before a coating composition is applied thereon. After application of the coating composition, the entirety may be baked by heating at about 50 to 150° C., if desired, for ensuring the curing of the primer composition.

The substrate or adherend to which the coating composition is to be applied includes shaped metal parts of iron, stainless steel, aluminum, galvanized steel, and nitrided steel having a subbing composition coated on their outer surface for improving weatherability and outer appearance (the subbing composition being based on various synthetic resins such as fluoro-resins, urethane resins, and acrylic resins); and shaped parts of polycarbonate, acrylic resins, ABS resins, polybutylene terephthalate (PBT) resins, polyphenylene sulfide resins, polyester resins, phenol resins, epoxy resins, nylon 66, and PFA film.

The coating composition which is applied to the substrate through the primer film is typically any of well-known silicone elastomer compositions. Included are thermosetting compositions comprising a diorganopolysiloxane raw rubber and a filler which are cured with organic peroxides; addition curing type compositions comprising a vinyl group-bearing diorganopolysiloxane raw rubber or oil, an organohydrogenpolysiloxane, and a filler which are heat cured at room temperature or elevated temperature in the presence of platinum catalysts; and condensation curing type compositions comprising a silanol group-bearing diorganopolysiloxane, a hydrolyzable silane or siloxane, and a filler which are cured with organic tin or titanium compounds.

The primer composition of the invention assists in bonding coating compositions such as silicone elastomers to substrates of coated metals and resins to form a firm and durable bond. The primer composition will find use as an adhesive in a wide spectrum of application.

EXAMPLE

Examples of the invention are given below by way of illustration and not by way of limitation.

Examples 1–6 & Comparative Examples 1–4

Primer compositions were prepared by mixing the components shown in Table 1 at room temperature until a uniform mixture was obtained.

TABLE 1

| Component (pbw) | Example | | | | | | Comparative Example | | | |
|---|---|---|---|---|---|---|---|---|---|---|
| | 1 | 2 | 3 | 4 | 5 | 6 | 1 | 2 | 3 | 4 |
| Methyl ethyl ketone | 80 | 80 | 80 | 80 | 80 | 80 | 80 | 80 | 80 | 80 |
| (A) Octoxycarbonylethyl-trimethoxysilane | 5 | 5 | 4 | 4 | 4 | 4 | — | 6 | 6 | 6 |
| (B) Tetraethoxysilane | 5 | 5 | 5 | 5 | 4 | 5 | 8 | — | 8 | 8 |
| (C-a) Hydroxyl-bearing silicon compound[1] | 4 | — | 4 | 4 | 4 | 4 | 6 | 6 | — | 6 |
| (C-b) Hydroxyl-bearing silicon compound[2] | — | 4 | — | — | — | — | — | — | — | — |
| (D) Epoxy resin[3] | 6 | 6 | 6 | 6 | 6 | 6 | 6 | 8 | 6 | — |
| (E) Tetra-n-butyl titanate | — | — | — | — | 2 | — | — | — | — | — |
| (F) Platinum compound[4] | — | — | 1 | — | — | — | — | — | — | — |
| (G) Isophorone diamine | — | — | — | 0.1 | — | — | — | — | — | — |
| (H) Phthalic anhydride | — | — | — | — | — | 1 | — | — | — | — |

1) 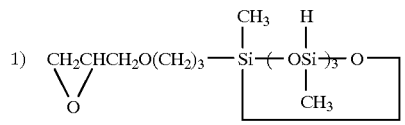

2) 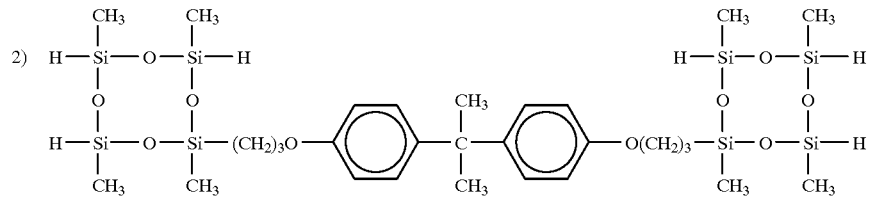

[3]Epikote 828 (trade mark by Shell, epoxy equivalent 190–210, molecular weight 380)
[4]1% chloroplatinic acid in n-butanol Using the primer compositions, the adhesion between a substrate and a coating composition (which is a silicone rubber composition) was examined by the following procedure. The results are shown in Tables 2 to 4.

The substrates used are metallic substrates of iron, aluminum, and galvanized steel and plastic substrates of a glass-reinforced epoxy resin, polyester carbonate, and ABS resin. The silicone rubber compositions used are shown below. All silicone rubbers are available from Shin-Etsu Chemical Industry K.K. under the indicated trade name.

Addition curing type

KE1950-50A/B

Mix ratio: 100/100

Curing conditions: press curing in a mold at 120° C. for 10 minutes

Condensation curing type

KE17/CATRM

Mix ratio: 100/0.5

Curing conditions: potting and curing at room temperature for 24 hours
Organic peroxide curing type
KE951U/C-8A
Mix ratio: 100/0.2
Curing conditions: press curing in a mold at 170° C. for 10 minutes A surface of the substrate was cleaned with acetone. The primer composition was applied to the substrate surface and air dried for 30 minutes to one hour. The uncured silicone rubber composition was rested thereon and cured and bonded to the substrate by the curing method corresponding to the silicone rubber composition.

The adhesion was tested by immersing the bonded sample in a 0.1% NaCl aqueous solution at 100° C. for 100 hours and then peeling the silicone coating from the substrate at an angle of 180°. The sample was rated "O" for 100% rubber fracture, "Δ" for rubber fracture plus interlaminar peeling, and "X" for 100% interlaminar peeling.

TABLE 2

Silicone rubber: addition curing type KE1950-50

|  |  | Example |  |  |  |  |  | Comparative Example |  |  |  |
|---|---|---|---|---|---|---|---|---|---|---|---|
| Substrate |  | 1 | 2 | 3 | 4 | 5 | 6 | 1 | 2 | 3 | 4 |
| Initial | Iron | O | O | O | O | O | O | Δ | Δ | O | Δ |
|  | Aluminum | O | O | O | O | O | O | Δ | Δ | O | O |
|  | Galvanized steel | O | O | O | O | O | O | X | Δ | X | Δ |
|  | Glass-epoxy | O | O | O | O | O | O | Δ | Δ | Δ | Δ |
|  | Polycarbonate | O | O | O | O | O | O | Δ | Δ | Δ | O |
|  | ABS resin | O | O | O | O | O | O | Δ | Δ | Δ | Δ |
| After water immersion | Iron | O | O | O | O | O | O | X | X | X | X |
|  | Aluminum | O | O | O | O | O | O | X | X | X | X |
|  | Galvanized steel | Δ | Δ | O | O | O | O | X | X | X | X |
|  | Glass-epoxy | O | O | O | O | O | O | X | X | X | X |
|  | Polycarbonate | Δ | Δ | O | O | O | O | X | X | X | X |
|  | ABS resin | Δ | Δ | O | O | O | O | X | X | X | X |

TABLE 3

Silicone rubber: condensation curing type KE17

|  |  | Example |  |  |  |  |  | Comparative Example |  |  |  |
|---|---|---|---|---|---|---|---|---|---|---|---|
| Substrate |  | 1 | 2 | 3 | 4 | 5 | 6 | 1 | 2 | 3 | 4 |
| Initial | Iron | O | O | O | O | O | O | O | O | O | O |
|  | Aluminum | O | O | O | O | O | O | O | O | O | O |
|  | Galvanized steel | O | O | O | O | O | O | X | Δ | Δ | Δ |
|  | Glass-epoxy | O | O | O | O | O | O | Δ | O | O | O |
|  | Polycarbonate | O | O | O | O | O | O | Δ | Δ | O | O |
|  | ABS resin | O | O | O | O | O | O | Δ | Δ | O | O |
| After water immersion | Iron | O | O | O | O | O | O | X | X | X | X |
|  | Aluminum | O | O | O | O | O | O | X | X | X | X |
|  | Galvanized steel | O | O | O | O | O | O | X | X | X | X |
|  | Glass-epoxy | O | O | O | O | O | O | X | X | X | X |
|  | Polycarbonate | O | O | O | O | O | O | X | X | X | X |
|  | ABS resin | O | O | O | O | O | O | X | X | X | X |

TABLE 4

Silicone rubber: organic peroxide curing type XE951

|  |  | Example |  |  |  |  |  | Comparative Example |  |  |  |
|---|---|---|---|---|---|---|---|---|---|---|---|
| Substrate |  | 1 | 2 | 3 | 4 | 5 | 6 | 1 | 2 | 3 | 4 |
| Initial | Iron | O | O | O | O | O | O | Δ | Δ | O | O |
|  | Aluminum | O | O | O | O | O | O | Δ | Δ | O | O |
|  | Galvanized steel | O | O | O | O | O | O | X | Δ | X | Δ |
|  | Glass-epoxy | O | O | O | O | O | O | Δ | O | O | O |
|  | Polycarbonate | O | O | O | O | O | O | Δ | Δ | O | O |
|  | ABS resin | O | O | O | O | O | O | Δ | Δ | O | O |
| After water immersion | Iron | O | O | O | O | O | O | X | X | X | X |
|  | Aluminum | O | O | O | O | O | O | X | X | X | X |
|  | Galvanized steel | Δ | Δ | O | O | O | O | X | X | X | X |
|  | Glass-epoxy | O | O | O | O | O | O | X | X | X | X |
|  | Polycarbonate | O | O | O | O | O | O | X | X | X | X |
|  | ABS resin | O | O | O | O | O | O | X | X | X | X |

It is evident from Tables 2 to 4 that the primer compositions within the scope of the invention are improved in adhesion, especially durable adhesion (as demonstrated by the water immersion test), assist in bonding silicone elastomers to various substrates, and remain effective even under severe ambient conditions.

Japanese Patent Application No. 299531/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

I claim:

1. A primer composition comprising
   (A) an organic silicon compound having in a molecule at least one group of the following general formula (1):

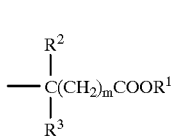

(1)

wherein $R^1$ is a substituted or unsubstituted monovalent hydrocarbon group or a group $—QSi(OR^4)_a(R^5)_{3-a}$ wherein Q is a divalent organic group, $R^4$ and $R^5$ each are a substituted or a unsubstituted monovalent hydrocarbon group, letter a is an integer of 0 to 3, $R^2$ and $R^3$ each are a hydrogen atom or substituted or unsubstituted monovalent hydrocarbon group, and letter m is equal to 0, 1 or 2, (B) an organic silane compound of the following average compositional formula (2):

$$R^7_b R^8_c (OR^9)_d SiO_{(4-b-c-d)/2} \qquad (2)$$

wherein $R^7$ is a substituted or unsubstituted monovalent hydrocarbon group, $R^8$ is a monovalent organic group having an addition reactive or condensation reactive functional group, $R^9$ is a substituted or unsubstituted monovalent hydrocarbon group, letters b, c, and d are numbers satisfying $0 \leq b \leq 3$, $0 \leq c \leq 3$, $0 < d \leq 4$, and $0 < b+c+d \leq 4$, and/or a partially hydrolyzed condensate thereof, (C) (C-a) an organic silicon compound having at least one SiH group in a molecule, represented by the following average compositional formula (3):

$$R^{10}{}_e H_f SiO_{(4-e-f)/2} \qquad (3)$$

wherein $R^{10}$ is a substituted or unsubstituted monovalent hydrocarbon group, letters e and f are numbers satisfying $0<e\leq 3$, $0<f\leq 3$, and $1\leq e+f<4$, and/or (C-b) an organic silicon compound having at least one SiH group and containing one to four substituted or unsubstituted divalent or trivalent aromatic rings or an alkylene group of 2 to 30 carbon atoms in a molecule, and (D) an epoxy resin soluble in an organic solvent.

2. The primer composition of claim 1 wherein the epoxy resin (D) is a bisphenol A epoxy resin.

3. The primer composition of claim 1 further comprising (E) an organic compound containing titanium or tin.

4. The primer composition of claim 1 further comprising (F) platinum or a platinum compound.

5. The primer composition of claim 1 further comprising (G) an aliphatic, alicyclic or aromatic amine.

6. The primer composition of claim 1 further comprising (H) an acid anhydride.

7. The primer composition of claim 1 wherein the epoxy resin (D) is selected from the group consisting of bisphenol A epoxy resins, bisphenol F epoxy resins, phenol novolak epoxy resins, cresol novolak epoxy resins, alicyclic epoxy resins, epoxy resins containing a heterocycle, hydrogenated bisphenol A epoxy resins, aliphatic epoxy resins, epoxy resins obtained by reacting aromatic, aliphatic or alicyclic carboxylic acids with epichlorohydrin, spiro ring-containing epoxy resins, glycidyl ether epoxy resins which are reaction products of o-allylphenyl novolak compounds and epichlorohydrin, and glycidyl ether epoxy resins which are reaction products of diallyl bisphenol compounds having an allyl group at the ortho position with respect to the hydroxyl group of bisphenol A and epichlorohydrin.

* * * * *